Aug. 17, 1926.

P. WILLIAMS

AUTOMOBILE BUMPER

Filed Feb. 2, 1926

1,596,786

Paul Williams, INVENTOR

BY Victor J. Evans

ATTORNEY

Patented Aug. 17, 1926.

1,596,786

UNITED STATES PATENT OFFICE.

PAUL WILLIAMS, OF LOS ANGELES, CALIFORNIA.

AUTOMOBILE BUMPER.

Application filed February 2, 1926. Serial No. 85,546.

This invention relates to attachments or accessories for use in connection with automobiles and the like, and has for its object the provision of a novel bumper structure for mounting upon the rear of a vehicle for the purpose of affording a certain amount of protection in case of minor collisions.

An important object is the provision of a bumper structure provided at its ends with journally mounted resilient rollers which will act to guide the vehicle in case it strikes gently against a wall or other vehicle, the resilience of the rollers tending to prevent serious damage to any surface contacted by the bumper.

Another object is the provision of a bumper which is provided with a hinged section capable of being swung out of the way in order to permit access to a tire carrier, the gasoline tank, tool chest or other auxiliary structure which might be mounted at the rear of the vehicle.

An additional object is the provision of a bumper which will be simple and inexpensive in manufacture, easy to install, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Referring more particularly to the drawings, the letter A designates the chassis of a motor vehicle including the usual longitudinally extending frame bars B. Other features such as wheels, drive shaft, rear axle and the like are illustrated but not referred to specifically inasmuch as they form no part of the present invention.

Figure 1:
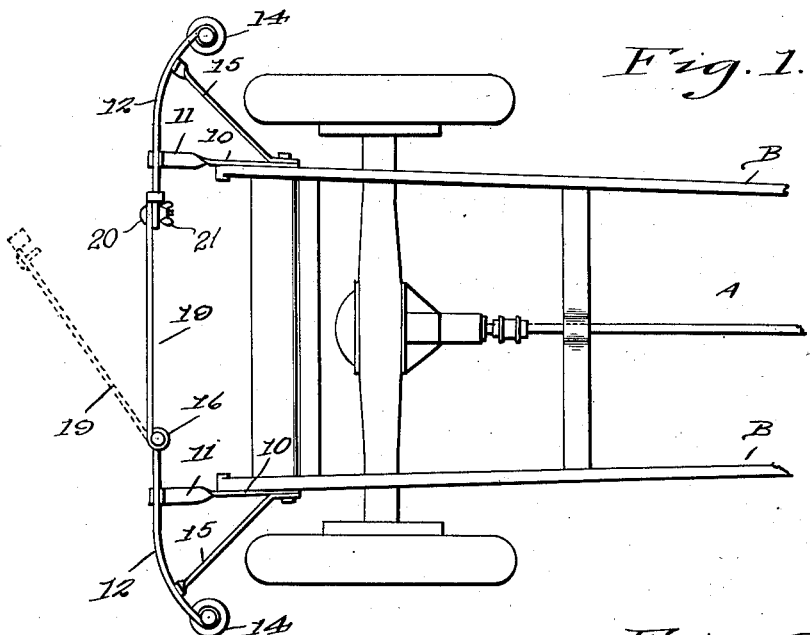
Figure 1 is a plan view of an automobile chassis equipped at its rear end with a bumper constructed in accordance with my invention.
Figure 2:
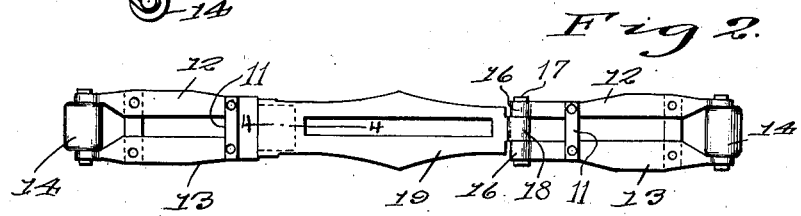
Figure 2 is a detail elevation of the bumper.
Figure 3:
Figure 3 is a fragmentary detail perspective view thereof.
Figure 5:
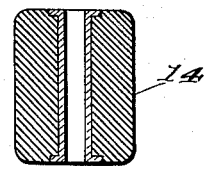
Figure 5 is a detail view taken through one of the rollers.
Figure 4:
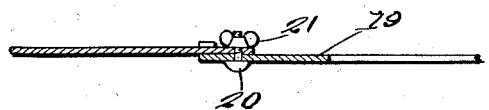
Figure 4 is a detail section taken on the line 4—4 of Figure 2.

In carrying out the invention, I provide rearwardly extending bracket arms 10 bolted or otherwise suitably secured to the frame bars B and carrying attaching portions 11 upon which are mounted upper and lower bars 12 and 13 which are rigid at their ends though provided with journally mounted rubber rollers 14. I also provide diagonally arranged reinforcing braces 15 which are secured to the frame bars B and to the end portions of the bumper for the purpose of giving added strength. The bars 12 and 13 are formed at one end with hinge knuckles 16 between which is pivoted, at 17, a knuckle 18 formed on one end of a swinging arm 19 which has its free end adapted for connection with the adjacent end of the other end portion of the bumper by means of the clamping bolt and nut indicated at 20 and 21 respectively. Obviously, by removing the nut and bolt, the swinging arm 19 may be swung away out of obstructing relation to the rear of the vehicle as indicated by dotted lines in Figure 1 so as to give access to the gasoline tank, trunk, tool chest, tire carrier or whatever else may be mounted at the rear.

From the foregoing description and a study of the drawings, it will be apparent that I have thus provided a simply constructed, inexpensive and easily installed bumper structure which when in applied position at the rear of a vehicle will operate most satisfactorily for protecting the same against damage. It is believed that the construction, operation and advantages will be readily apparent to one skilled in the art, without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. An automobile bumper comprising supporting bracket arms adapted to be secured to the rear end portions of the longitudinal frame bars of a vehicle chassis, bars carried by the bracket arms and arranged in spaced relation, a horizontally swingable bar element pivotally connected with the inner end of one bar, and means for detachably connecting the other end of said pivoted bar element with the inner end of the other bar, said means comprising a clamping bolt carried by the pivoted bar member and insertible through a hole in one end of the contacting bar member and equipped with a securing nut.

2. An automobile bumper comprising supporting bracket arms adapted to be secured to the rear end portions of the longitudinal frame bars of a vehicle chassis, bars carried by said bracket arms and arranged in spaced relation, a movable bar element pivotally connected with the inner end of one bar, and means for detachably connecting the other end of said pivoted bar element with the inner end of the other bar, the outer end of the first named bar members being forked and resilient rollers arranged in vertical position and journaled within said forks.

3. An automobile bumper comprising supporting bracket arms adapted to be secured to the rear end portions of the longitudinal frame bars of a vehicle chassis, bars carried by said bracket arms and arranged in spaced relation, a horizontally swingable bar element pivotally connected with the inner end of one bar, and means for detachably connecting the other end of said pivoted bar element with the inner end of the other bar, said first named bar members consisting of a pair of upper and lower bars spaced apart, and transverse elements secured to and maintaining said elements in spaced relation.

In testimony whereof I affix my signature.

PAUL WILLIAMS.